United States Patent
Gruendel et al.

(10) Patent No.: US 7,629,718 B2
(45) Date of Patent: Dec. 8, 2009

(54) TRANSVERSE FLUX MACHINE AND TURBINE-TYPE MACHINE HAVING SUCH A TRANSVERSE FLUX MACHINE

(75) Inventors: Andreas Gruendel, Starnberg (DE); Hubert Herrmann, Haimhausen (DE); Bernhard Hoffmann, Starnberg (DE)

(73) Assignee: MTU Aero Engines GmbH, Munich (DE)

(*) Notice: Subject to any disclaimer, the term of this patent is extended or adjusted under 35 U.S.C. 154(b) by 564 days.

(21) Appl. No.: 11/413,875

(22) Filed: Apr. 28, 2006

(65) Prior Publication Data

US 2007/0216249 A1 Sep. 20, 2007

(30) Foreign Application Priority Data

Mar. 16, 2006 (DE) .................. 10 2006 012 215

(51) Int. Cl.
*H02K 23/66* (2006.01)
(52) U.S. Cl. .................. 310/68 B; 310/156.02
(58) Field of Classification Search ............ 310/49 R, 310/68 B, 68 C, 156.02, 257
See application file for complete search history.

(56) References Cited

U.S. PATENT DOCUMENTS

| | | | |
|---|---|---|---|
| 2,797,346 A * | 6/1957 | Ranseen ............... 310/46 |
| 3,218,494 A | 11/1965 | Bacon et al. | |
| 5,932,935 A * | 8/1999 | Clifton et al. ............ 307/60 |
| 6,229,238 B1 * | 5/2001 | Graef ................... 310/164 |
| 6,566,775 B1 * | 5/2003 | Fradella ................ 310/90.5 |
| 6,750,588 B1 * | 6/2004 | Gabrys ................. 310/268 |
| 6,949,855 B2 * | 9/2005 | Dubois et al. ........... 310/152 |
| 7,279,820 B2 * | 10/2007 | Grundl et al. ......... 310/156.02 |
| 2004/0150376 A1 | 8/2004 | Peter | |
| 2005/0012427 A1 | 1/2005 | Seki et al. | |

FOREIGN PATENT DOCUMENTS

GB    1 401 245 A    7/1975

* cited by examiner

*Primary Examiner*—Thanh-Tam T Le
(74) *Attorney, Agent, or Firm*—Crowell & Moring LLP

(57) ABSTRACT

In a transverse flux machine, the rotor has multiple permanent magnet rings that are arranged axially in proximity to one another. The stator surrounds the rotor concentrically in at least some sections, forming an air gap. The stator has multiple stator coils oriented coaxially with the permanent magnet rings and the stator coil has two terminals. An active reactive power source to be controlled has two terminals for each stator coil, the respective stator coil being connected to each. In the event of a fault incident in one of the stator coils, a monitoring arrangement supplies triggering signals for the active reactive power source so that the two terminals of the respective stator coil are interconnected with a low resistance.

16 Claims, 4 Drawing Sheets

—1a-2b-3c-4d-1d-2a-3b-4c-1c-2d-3a-4b-1b-2c-3d-4a—

TRANSVERSE FLUX MACHINE AND TURBINE-TYPE MACHINE HAVING SUCH A TRANSVERSE FLUX MACHINE

This application claims the priority of German Patent Document No. 10 2006 012 215.1, filed Mar. 16, 2006, the disclosure of which is expressly incorporated by reference herein.

BACKGROUND OF THE INVENTION

Synchronous generators are frequently used to generate electric power. When such machines are designed as internal rotors, they have an external winding (stator winding) that generates a magnetic rotational field. A magnet wheel (rotor) carries either permanent magnets or an energizer winding to generate the field. With these polyphase machines, the rotor rpm is equal to the number of rotating fields. The stator is comprised of stratified magnetic iron plates insulated electrically from one another and is designed to reduce eddy current losses. The stator winding is inserted and wired into axially parallel grooves between the poles of the stator pointing radially inward. The alternating magnetic fields revolving with the movement of the rotor overcome the air gap between the rotor poles and stator poles and intersect with the stator windings. An alternating voltage is generated in each of the windings because of the magnetic fields which alternate with each revolution of the rotor, the frequency of this alternating voltage being synchronous with the rotor rpm. Through a suitable arrangement and wiring of stator windings, the synchronous machine may generate single-phase or polyphase alternating voltage. In generator operation, the active power is determined by the angular displacement, which is obtained as the angle of rotation between the rotor of the loaded machine and the off-load machine. If the angle of rotation becomes too large, the machine rpm increases drastically and the machine may be destroyed due to the centrifugal force acting on its own components. In this operating state, it must be shut down as quickly as possible and resynchronized. For use in the aviation sector in particular, electric/mechanical access to the generator is impossible for obvious reasons. Furthermore, the electromechanical efficiency of synchronous machines is limited not least of all because of the winding overhangs.

Machines related to permanent-field synchronous machines in terms of their basic design include transverse flux machines which have a hoop winding, in contrast with normal machines having full-pitch windings. The magnetic flux runs transversely (perpendicularly) to the plane of rotation. A rotor has multiple permanent magnet rings arranged adjacent to one another axially, each ring comprised of individual magnets oriented radially with alternating magnetic directions. The stator has one or more hoop windings which are encircled by intermeshing soft magnetic poles. When the rotor moves in relation to the stator, an alternating magnetic flux is passed through each stator coil, inducing a generator voltage.

Decoupling of the magnetic and electric circuits in transverse flux machines facilitates their respective dimensioning. In addition, this eliminates the so-called winding overhangs which are customary with synchronous machines and do not contribute to generation of torque. Machines that operate according to the transverse flux principle may thus have considerably lower ohmic losses due to the design than a longitudinal flux motor that is otherwise comparable in terms of the magnetic shear forces. This permits a much finer pole pitch, which already results in a high torque and a higher efficiency at a low rpm. However, transverse flux machines have a more complex mechanical design. High efficiencies can be achieved with permanent-field machines, but the permanent magnets to be used with them are cost-intensive.

The disadvantages of both synchronous machines and the traditional transverse flux machines as mentioned above may still be acceptable in some applications but they are unacceptable in the aviation sector due to the high safety demands. Aircraft engines are subject to constantly increasing demands. The important thing in this field is to discover any error incidents and error sequences that do occur as soon as possible; the possibilities for avoiding these errors are important. An error-tolerant design of the propulsion unit and its components contributes to such safety if it does not lead to any major consequences in a fault incident.

Therefore, the object of the present invention is to provide a transverse flux machine which has a high inherent operating reliability and in which any fault incident that nevertheless occurs can be brought to a safe state (fail-safe).

SUMMARY OF THE INVENTION

As the solution to this problem, the present invention provides a transverse flux machine in which a rotor has multiple permanent magnet rings arranged axially in proximity to one another, each being formed by individual magnets having alternating magnetic orientations in the radial direction; the stator surrounds the rotor concentrically in at least some sections, forming an air gap, and has one or more stator coils oriented coaxially with the permanent magnet rings; one stator coil has two terminals and intermeshing poles protrude beyond it on its side facing the air gap toward the rotor, these poles facing the permanent magnet rings of the rotor and each being aligned with individual magnets of the individual magnets, an active reactive, or wattless, power source to be controlled, having two terminals for each stator coil, to which the respective stator coil is connected, at least one monitoring arrangement which in a fault incident supplies triggering signals for the active reactive power source in one or more stator coils so that the two terminals of the respective stator coil are joined together with a low resistance.

In one embodiment, the stator coil is held between two soft magnetic stator disks each having alternating intermeshing poles on their edges facing the air gap toward the rotor. On the side of the stator coil facing away from the air gap, a continuous edge of one or both stator disks surrounds the stator coil.

Due to this design of the generator having a higher magnetic stray flux component, a fault withstandability lowers the effective current below the operating current in the event of a short circuit so there is no imminent risk of heating or overheating. Due to the reactive power source, the generator is also brought into a safe operating state.

The monitoring arrangement may have a very simple design and is set up to detect one or more of the following states as a fault incident in the transverse flux machine:
a short circuit in a winding of a stator coil,
a short circuit in multiple windings of a stator coil, a short circuit in all windings of a stator coil,
a single short circuit to ground in a stator coil,
a multiple short circuit to ground in a stator coil,
a single short circuit to ground in multiple stator coils,
a multiple short circuit to ground in multiple stator coils,
a low-resistance connection between two stator coils,
a high-resistance connection within one stator coil, or
a high-resistance connection between two stator coils.

In one embodiment of the present invention, the monitoring arrangement may be set up so that current flow in the stator coils of the transverse flux machine and/or a voltage drop on the stator coils is/are detected and compared to detect a fault incident in one or more stator coils.

Therefore, changes in EMF, i.e., the voltage applied to the terminals of the unloaded stator coils (="electromotive force"), induced due to short circuits or interruptions and the coil impedance in a stator coil in relation to the other stator coils can be detected very quickly. No high accuracy demands of the current transformer and voltage transformer are necessary for detecting short circuits and interruptions because in these cases the impedance and EMF are altered significantly.

In another embodiment of the present invention, the monitoring arrangement may be set up to detect heating of the stator coil in question by means of temperature sensors provided on one or more stator coils of the transverse flux machine in order to thereby detect overloads, short circuits or the like in the stator coil in question.

This allows reliable detection of even creeping fault incidents, which are manifested initially only through increased losses, and this detection can be selective for each stator coil.

In another embodiment of the present invention, the monitoring arrangement may be set up for detecting short circuits to ground from involving one or more stator coils of the transverse flux machine by means of a potential monitoring circuit for insulation monitoring.

In one embodiment of this invention, the active reactive power source may have two half-bridges for switching electric powers. The two half-bridges are wired for the respective stator coil to form a full bridge. It should be pointed out here that a converter is usually used anyway for converting the output power supplied by the transverse flux machine during operation. This converter usually contains such half-bridges for switching electric powers and therefore assumes a double function in the present inventive configuration of the jet engine turbine generator: converter and active reactive power source.

The two half-bridges of the active reactive power source preferably have at least two semiconductor switches connected in series. Depending on the (reactive) power to be switched, it is also possible to switch several such series-connected semiconductor switches. Each semiconductor switch has a control input. The first semiconductor switch has a first power terminal that is to be connected to a high-voltage potential. The second semiconductor switch has a second power terminal that is to be connected to a low voltage potential. A second power terminal of each first semiconductor switch is connected to a first power terminal of the respective second semiconductor switch, forming a connection for the stator coil.

In addition, each of the semiconductor switches may have a free-wheeling diode which is parallel to the two power terminals of the respective semiconductor switch.

The monitoring arrangement controls the active reactive power source in the event of a fault incident with the jet engine turbine generator, so that either the second semiconductor switches remain conducting and the first semiconductor switches remain untriggered in the two half-bridges or the first semiconductor switches remain conducting and the second semiconductor switches remain untriggered. In both cases, a short-circuit current takes a controlled path over the particular semiconductor switches that are conducting at that time.

In addition, according to the present invention, the stator coils in the transverse flux machine and their specific loading are of dimensions and configuration such that in a fault incident, a magnetomotive force occurs which never reaches the rated magnetomotive force (=rated current×number of windings). This ensures that even in the event of a short circuit in the entire winding, only a current below the rated level can flow. This is based on the fact that the current to be supplied by the stator coil in turn leads to additional magnetic flux through the stator coil, so that an additional voltage component is self-induced in the stator coil, counteracting the respective change in current. In the event of passive termination of the stator coil due to a consumer or even a short circuit of the stator coil, this self-induction component leads only to a limited current, namely a current far below the rated level. However, the rated current required for full power output can be achieved only by cooperation of the stator coil with a reactive power generator. Without an active reactive power generator, i.e., in a fault incident, a magnetomotive force that approximately achieves the rated magnetomotive force level is never achieved according to this invention even in the event of a short circuit. The entire stator coil thus establishes only a current below the rated level even in the event of a short circuit. However, in the event of a short circuit of only a portion of the stator coil or only one winding, the local current flowing there can reach or even exceed the rated level.

Energization by the permanent magnets leads to a constantly induced voltage in the stator winding of the transverse flux machine as long as its rotor is rotating in relation to its stator. It is thus impossible in principle to shut down a current which occurs in a short circuit case. The current flowing in the short circuit case reaches at the maximum the rated current level which the winding is capable of carrying in the long run thanks to the design according to this invention. On the other hand a short-circuit current at a defect is a problem inasmuch as a high power is released locally at the short circuit site due to the undefined high resistance, and frequently there is even an electric arc which can burn for a long period of time or even continuously. The present invention offers protection against this risk through controlled short circuiting of the stator coil.

Another risk could occur in shutdown of the power inverter and/or the respective H bridge at a high generator rpm, because then the induced voltage could charge up a downstream d.c. link to an unacceptably high voltage level via the free-wheeling diodes without a field-weakening current component. The present invention protects against this through controlled short circuiting of the respective stator coil.

With this measure, the transverse flux machine remains constantly ready for operation in the entire rpm range under all conditions without any risk to adjacent parts. Only the outputable power is reduced according to the number of short-circuited stator coils.

These are all significant advantages for use of the inventive transverse flux machine in the aviation sector.

Moreover, in comparison with traditional embodiments of generators, this permits a design which permits great savings in terms of design space (with a comparable power output).

Another important advantage of the inventive concept consists of the fact that practically only the magnetically active components (the permanent magnets) contribute toward the inertial mass of the rotor, whereas all other parts of the motor (coils, magnetic return path, etc.) are assigned to the stator. This makes it possible to achieve a particularly high ratio of force applied by the electric machine to inertial mass.

Due to the ring disk arrangement of the stator coil(s) of the electric machine, which can be designed to be very simple, it is possible to minimize the vibrating forces acting on the coil to yield minimal vibration of the coil or friction of the coil against the wall of the stator coil chamber. It is thus possible to make due with minimal insulation material and/or lining material of the stator coil chamber. This also contributes to the compactness and reliability of the overall arrangement. Furthermore, this results in a high power density even in small concepts according to this invention because the filling factor of the stator coil chamber (coil volume in the stator coil chamber based on the total volume of the stator coil chamber) is high.

The stator may be constructed from electric steel plate parts in a known way. However, to simplify production, it is also possible to design it at least partially as a soft magnetic molded body, e.g., made of pressed and/or sintered metal powder. The stator is preferably made of solid iron because the eddy current properties of solid iron are sufficient even under increased dynamic demands.

Although the preceding discussion has consistently referred to a transverse flux machine in the form of a generator, it is self-evident that this permits both generator operation and motor operation (i.e., driving operation). According to this invention, the term "transverse flux machine" is understood to include both generators and motors. It is thus possible through the present invention to use a generator for converting the torque available there into electricity. On the other hand, the electric machine may also induce rotation of parts during motor operation. The present invention may be implemented in the form of internal rotor machines and external rotor machines.

A relatively high leakage inductance of the stator and/or stator coils is utilized by the configuration described above; this inductance is relatively high due to structural factors, so in the case of a persistent short circuit, the current flowing through the stator coil is always in a noncritical low range. An inherent safety can be provided due to the sustained short-circuit strength associated with this so that the proposed configuration is excellently suited for the aviation sector. The additional controlled shutdown of a stator coil that is subject to a fault provides a redundant systematically independent safety.

Furthermore, according to the present invention, a short-circuit current between individual winding sections of the stator coil is converted to a harmless range through controlled short circuiting of the entire stator coil.

Finally, in another embodiment of the present invention, a short-circuit current can be carried to the outside in a risk-minimizing manner due to the special embodiment of the stator coil. To do so, at least one of the stator coils is comprised of multiple ring sections, several of the ring sections together forming a ring which is arranged essentially concentrically with neighboring rings, each ring section being connected to a ring section that is farther on the outside or on the inside radially, the connection being situated on at least one of its two ends, and ring sections entirely on the outside or inside radially are connected at one of their two ends to ring sections that are entirely on the inside and/or outside radially, respectively. This aspect of the present invention according to which the stator coil is to be designed advantageously may also be used independently of the reactive power source to be triggered by the monitoring arrangement with a considerable increase in inherent safety of the transverse flux machine according to the present invention. However, the combined use of these options offers particularly high protection against incidents.

The present invention can be used to advantage in automotive or stationary applications. In particular, however, the present invention is used in conjunction with a turbine-type machine, in particular a gas turbine, especially an aircraft gas turbine because the specific advantages of the present invention are manifested especially well in this context.

The transverse flux machine is especially linked in a rotationally fixed manner to a rotating shaft of the turbine-type machine. For use in aircraft turbines, the transverse flux machine is advantageously linked in the area of the low-pressure turbine to the low-pressure shaft, which is readily accessible in the rear area of the aircraft turbine.

As already mentioned above, the transverse flux machine may also be used as a generator or as a motor/starter. The transverse flux machine preferably combines the two functions in one unit in the form of a so-called starter generator. The present invention may be used to full advantage in automotive or stationary applications.

BRIEF DESCRIPTION OF THE DRAWINGS

Additional features, properties, advantages and possible modifications will be clear for those skilled in the art on the basis of the following description in which reference is made to the accompanying drawings.

DETAILED DESCRIPTION OF THE DRAWINGS

Figure 1:
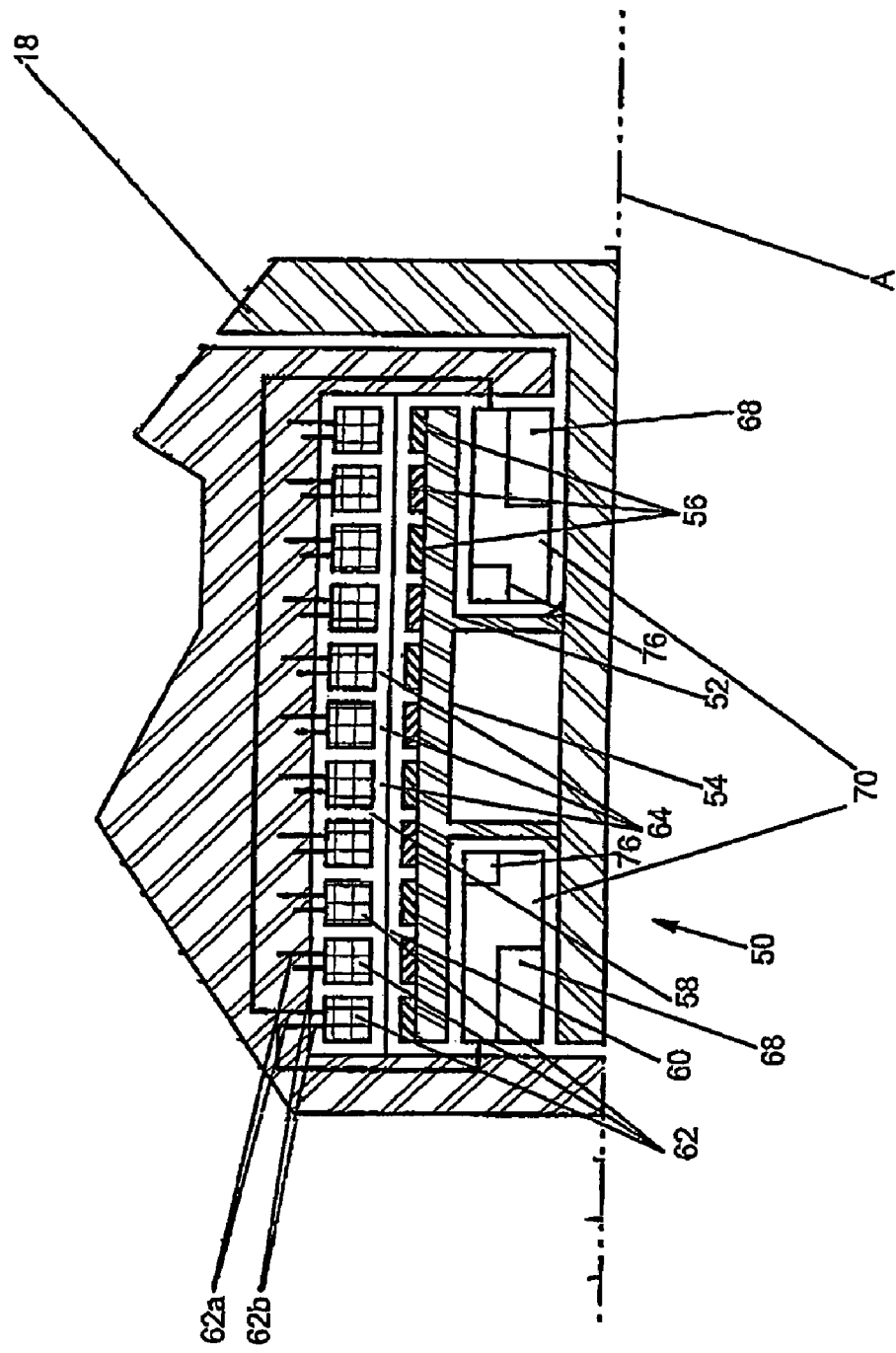
FIG. 1 shows a schematic partial longitudinal sectional diagram of an inventive transverse machine as a starter generator of a gas turbine, in particular an aircraft gas turbine.
Figure 2:
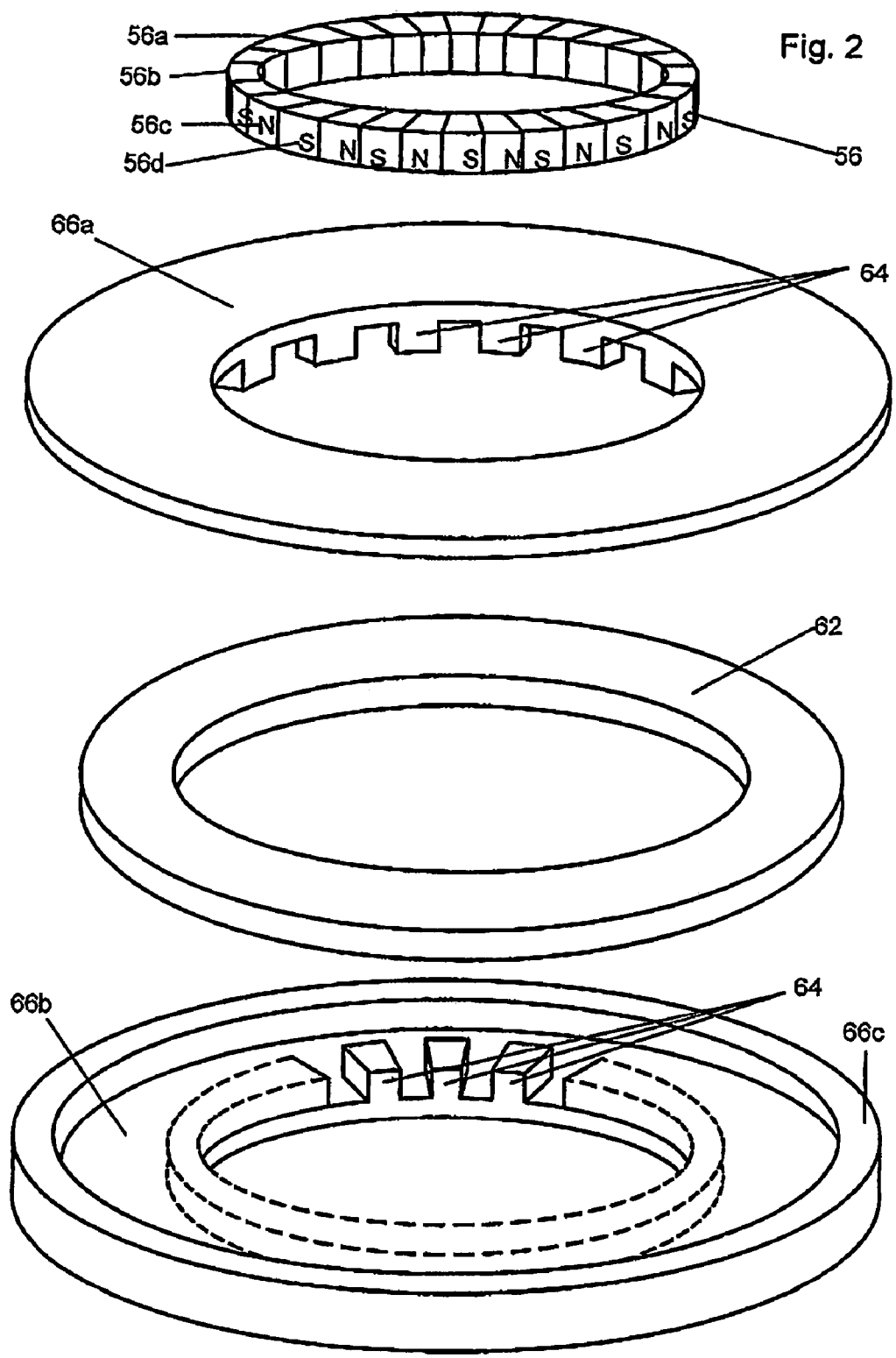
FIG. 2 shows a schematic enlarged partial view in an exploded perspective diagram of the electric machine shown as a starter generator in FIG. 1.

FIG. 1 shows a transverse flux machine as a starter generator in a partial longitudinal sectional view. A rotor 52 of the generator 50 is connected in a rotationally fixed connection to the rotatingly mounted shaft 18 of the low-pressure turbine (not shown, along with the entire gas turbine, for the sake of simplicity). To this end, the starter generator may be flange-mounted on the shaft in particular. The rotor 52 has a hollow cylindrical carrier 54 on whose outside surface several permanent magnet rings 56 are mounted, these magnet rings being arranged in proximity to one another coaxially to the central longitudinal axis A. The permanent magnet rings 56 are formed by individual magnets 56a, 56b, ... with magnetic orientation N, S, N, S alternating radially (see also FIG. 2). The starter generator 50 has a stator 58 which is made of a soft magnetic material, e.g., electric steel plate parts. It is also possible to design it as a molded soft magnetic body, e.g., made of pressed and/or sintered metal powder. The stator 58 surrounds the rotor 52 concentrically, forming an air gap 60, and has multiple stator coils 62 oriented coaxially with the permanent magnet rings 56 and aligned with the latter. A stator coil 62 has two terminals 62a, 62b and has soft magnetic intermeshing poles 64 protruding above it on its end facing the air gap 60 toward the rotor 52. These poles 64 are each arranged on a soft iron ring disk 66a, 66b on the inside edge thereof along the entire inside circumference. The poles 64 grip one another in the manner of claw poles facing the permanent magnet rings 56 of the rotor 52 and aligned with individual magnets of the individual magnets 56a, 56b. This is illustrated in detail in FIG. 2. One or both of the soft iron ring disks 66a, 66b have a ring web 66c on their outside edge, the ring web being of such dimensions that in the assembled state of the two soft iron ring disks 66a, 66b the corresponding stator coil 62 is enclosed. The poles 64 of the two soft iron ring disks 66a, 66b are mutually insulated by a distance. According to the number of stator coils and/or magnet rings in the generator (see FIG. 1) the configurations illustrated in FIG. 2 are assembled.

It should be pointed out that integration of the starter generator into the gas turbine is accomplished here on the low-pressure shaft in the area of the low-pressure turbine, but it may also be located elsewhere.

An active reactive power source 70 which is connected to the respective stator coil 62 and is controlled electronically is provided for each stator coil 62 with two terminals 62a, 62b. In addition, at least one monitoring arrangement 68 is provided, this arrangement being connected to the reactive power source 70 and with which a fault incident in one or more stator coils 62 supplies trigger signals for the active reactive power source so that the two terminals 62a, 62b of the respective stator coil 62 are interconnected with the lowest possible resistance—in a word, they are short circuited.

It has been found that in particular for the case of the application in the aviation sector described here, a plurality of different fault incidents can be detected with this configuration and brought to a safe operating state. These include short circuits of one, more or all the windings of one or more stator coils 62, a single or multiple short circuit to ground of one or more stator coils 62, a low-resistance connection between two stator coils 62 or a high-resistance connection within one stator coil 62 and a high-resistance connection between two stator coils 62.

The monitoring arrangement 68 is set up to detect a current flow in the stator coils 62 and a voltage drop on the stator coils 62 and to compare them to detect a fault incident in one or more stator coils 62. In addition, the monitoring arrangement 68 is set up to detect heating of the stator coils 62 by means of multiple temperature sensors 74 mounted on stator coils 62, in order to thereby detect overloads, short circuits or the like in the respective stator coils 62.

In addition, the monitoring arrangement 68 is equipped to detect short circuits to ground of one or more stator coils 62 by means of a potential monitoring circuit 76 for monitoring the insulation. The exact positioning of the temperature sensors provided for this purpose and the current/voltage detectors on the stator coils is not illustrated in detail here for the sake of simplicity.

Figure 3:
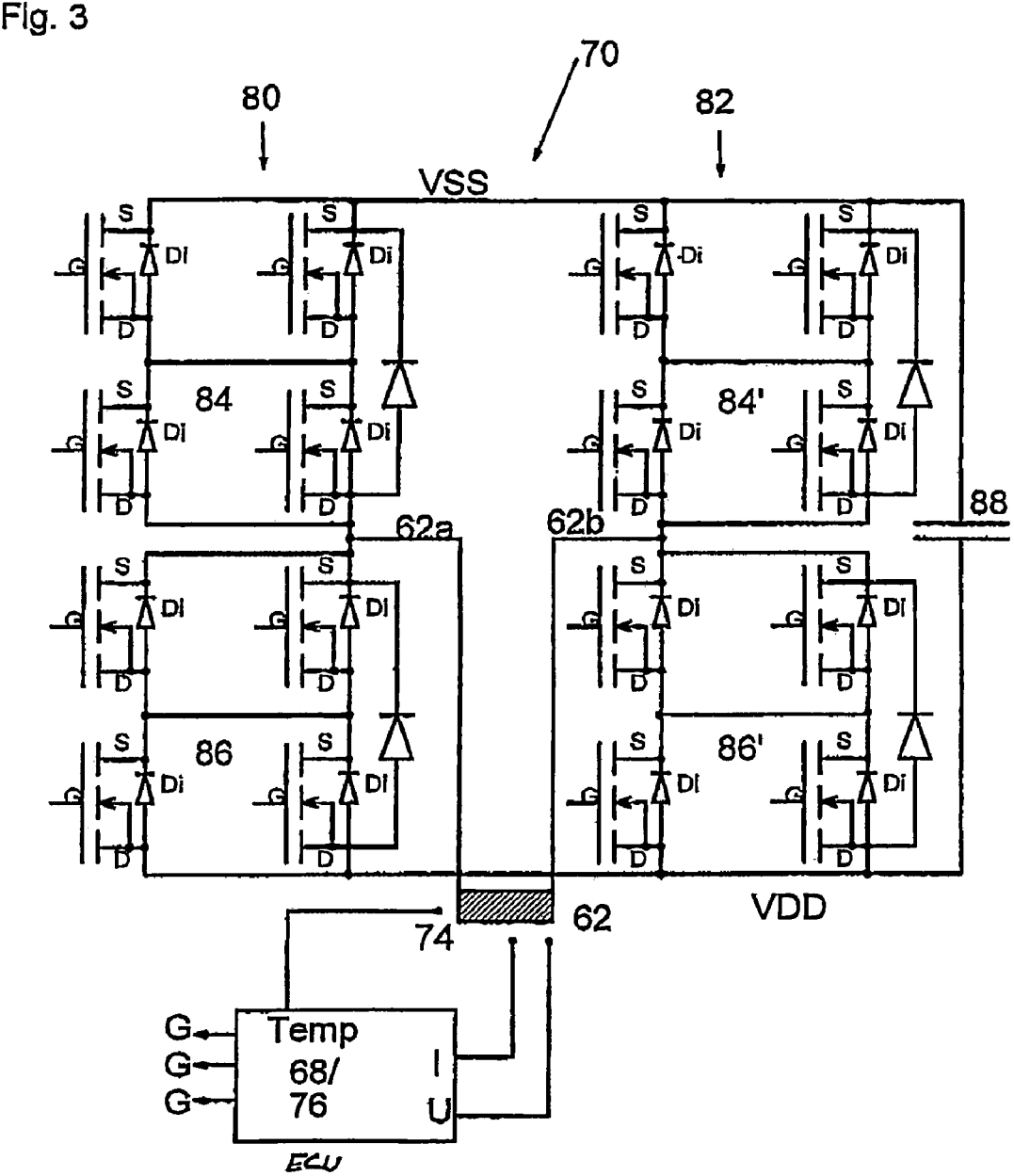
FIG. 3 shows a schematic diagram of an inventive active reactive power source to be controlled, to be connected to the stator coil of the transverse flux machine.

FIG. 3 shows the active reactive power source 70 which has two half-bridges 80, 82 for switching electric powers. Each of the two half-bridges 80, 82 has at least two power MOSFET semiconductor switches 84, 86; 84', 86' connected in series.

Each semiconductor switch 84, 86 is an N channel MOSFET having a control input G (=gate). The first semiconductor switch 84 has a first power terminal S (=source) which is to be connected to a high-voltage potential $V_{SS}$. The second semiconductor switch 86 has a second power terminal D (=drain) that is to be connected to a low voltage potential $V_{DD}$.

A second power terminal D (=drain) of each first semiconductor switch 84 is connected to a first power terminal S (=source) of the respective second semiconductor switch 86, forming a terminal 62a, 62b for the stator coil 62. Each semiconductor switch 84, 86; 84', 86' has an intrinsic freewheeling diode which is in parallel with the two power terminals of the respective semiconductor switch and which has silicon barrier layer diode properties.

A backup capacitor 88 is provided between the high and low voltage potentials $V_{SS}$ and $V_{DD}$. The MOSFETs are triggered at their control inputs G via gate resistors (not illustrated further here) through a control circuit ECU.

The control circuit includes the monitoring arrangement 68 with the potential monitoring circuit 76 and the temperature sensors 74. Due to the determination of the currents flowing in the stator coils 62 and/or the voltages dropping on the stator coils 62, the control circuit is capable of detecting a fault incident directly due to the detection of the currents flowing in the stator coils 62 and/or the voltages dropping on the stator coils 62 and the temperatures and in this case it is capable of controlling the active reactive power source 70 via its control inputs G in such a way that either the two semiconductor switches 86, 86' remain conducting and the first semiconductor switches 84, 84' remain untriggered in the two half bridges 80, 82 or the first semiconductor switches 84, 84' remain conducting and the second semiconductor switches 86, 86' remain untriggered. In both cases, the respective stator coil 62 is short circuited. Even if the arrangement explained above starts with the controlled short circuit being induced by means of the converter which is present anyway in a generator in conjunction with the monitoring arrangement 68, it should nevertheless be emphasized that this can be achieved even through switches (semiconductor switches or relays) that are independent of the converter and this is also covered by the present invention.

In the case of such a controlled short circuit induced in this way, the affected stator coil supplies only a very small portion of the possible power rating, while the power inverter continues to feed the (reactive) current into the affected stator coil in a regulated manner as well as into the other stator coils. The maximum torque absorbed in the affected disk is reduced in comparison with its share of the rated torque. Thus the maximum usable torque of the entire generator is reduced. When a problem occurs during delivery of a very low power or even when idling, the torque taken up may increase spontaneously, however.

The possibility of the short circuit expanding to other stator coils, in particular the neighboring stator coils, is ruled out because of the partitioning by the stator iron core. The safety measures intervene quickly enough to prevent the soft iron ring disk between the stator coils from burning through or to prevent damage to the neighboring coil due to the local heating that occurs through the soft iron ring disk.

FIG. 3 shows only one stator coil with the reactive power source/converter assigned to it for the sake of simplicity, this converter being assigned to the mounting arrangement 68. According to this invention, however, all the stator coils are equipped in this way, the respective reactive power sources/converters being supplied with control signals from a common monitoring arrangement 68, these signals receiving their information from sensors distributed among all the stator coils of the generator stator. For generator operation, the converter is to be controlled via an electronic controller so that pulsating current flowing in the stator coils is converted into a corresponding effective current, so this electronic controller may be equipped with the corresponding sensors and current/voltage pickups and may be programmed/configured accordingly, and may even assume the function of the monitoring arrangement 68.

The stator coils 62 and their specific load are dimensioned so that a magnetomotive force that reaches the rated magnetomotive force of the stator coils 62 will never occur in a fault incident. Thus, in the event of a controlled short circuit induced in this way in particular, it is possible to achieve the result that a continuous current through the short-circuited stator coils is lower than half the current rating in a preferred embodiment of the present invention. Such a low short-circuit current which is determined by the structure provides a considerable safety factor.

Figure 4:
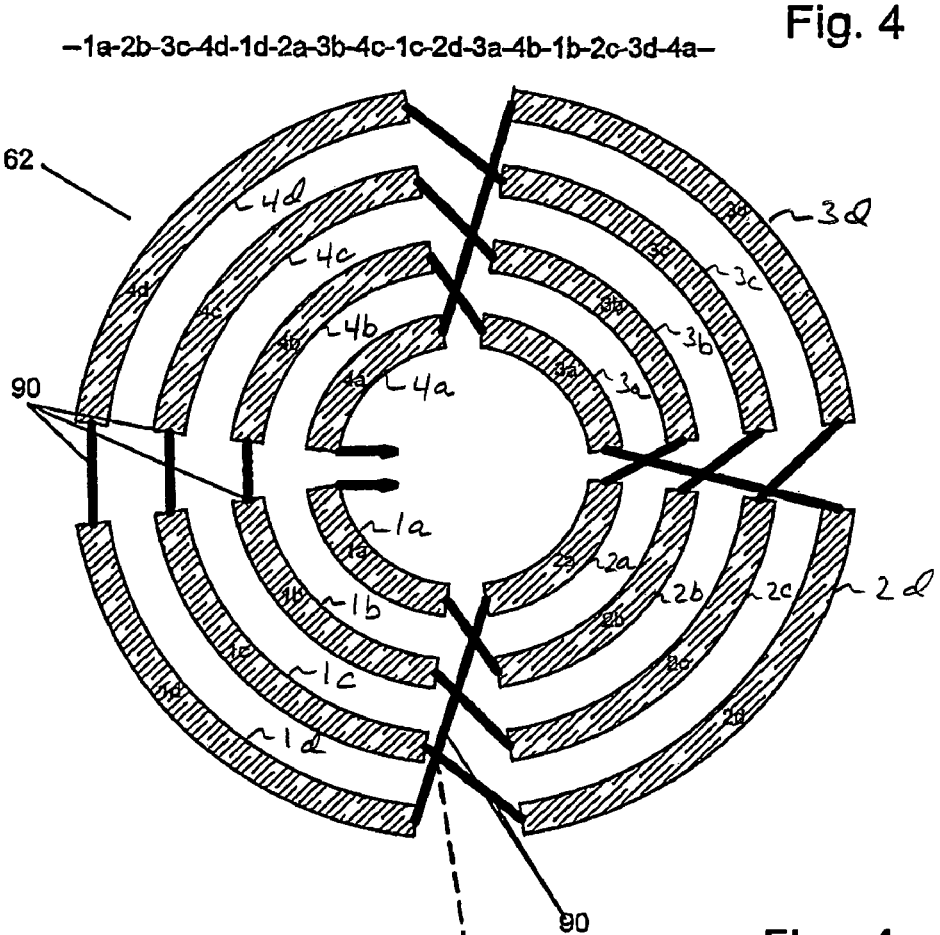
FIG. 4 shows a schematic diagram of an inventive stator coil of the transverse flux machine in a view from above.

The stator coils 62 are each formed from multiple ring sections 1a . . . 4d (see FIG. 4). In the present embodiment the ring sections are approximately quarter circular rings, of which four sections having the same radius of curvature together form a ring with interruptions. Multiple rings (four in this example) are essentially arranged concentrically with their neighboring rings.

The individual ring sections 1a . . . 4d each have two ends. Each ring section is connected at one of the two ends to an adjacent ring section situated radially farther to the outside or farther to the inside adjacently. For example, the ring section 2b is connected at one end to the ring section 1a and at the other end to the ring section 3c.

The ring sections 1a, 2a, 3a, 4a and/or 1d, 2d, 3d, 4d that are entirely on the outside or inside radially are connected at one of their two ends to ring sections that are entirely on the inside and/or outside radially, respectively. For example, the ring section 1d is connected at one end to the ring section 2a.

Figure 4A:
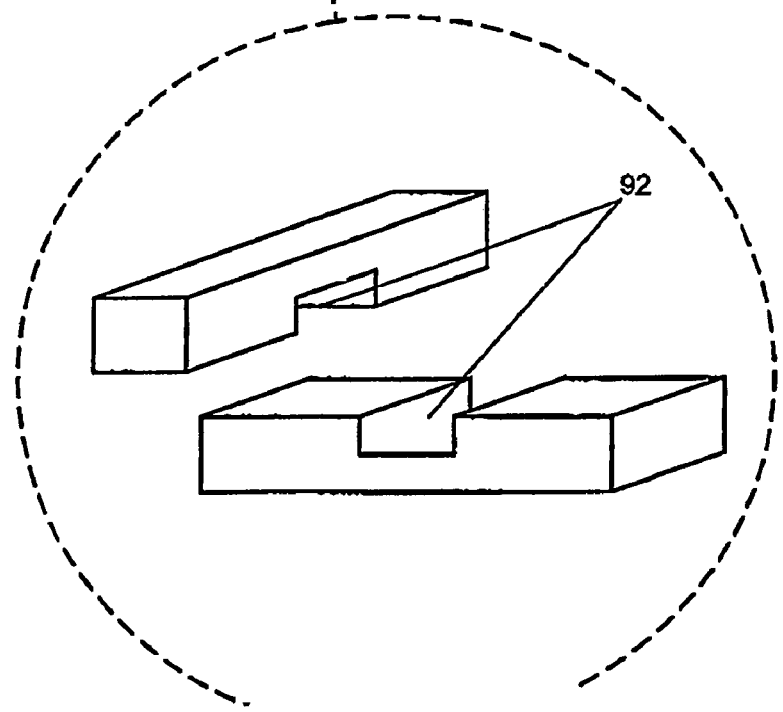
FIG. 4a shows an embodiment of how the connecting pieces that connect the ring sections of the stator coils are provided with corresponding recesses that are open at the edges and fit into one another accordingly.

The individual ends of the ring sections are connected to the connecting pieces 90 so that they conduct electricity. The connecting pieces 90 between the ends of the ring sections intersect. Therefore FIG. 4a shows an embodiment of how the connecting pieces 90 are to be provided with corresponding recesses 92 that are open at the edges and fit into one another accordingly.

On the whole, through the embodiment of the stator coils described above, a configuration of stator coils 62 that is especially reliable but also is compact and saves on space can be achieved.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A transverse flux machine, comprising:
   a rotor having a permanent magnet ring;
   a stator surrounding the rotor concentrically and forming an air gap with the rotor, the stator including a stator coil oriented coaxially with the permanent magnet ring and the stator coil including two terminals;
   a power source including two terminals connected to the stator coil; and
   a monitoring arrangement which supplies a trigger signal to the power source in an event of a fault incident in the stator coil so that the two terminals of the stator coil are interconnected with a low resistance.

2. The transverse flux machine according to claim 1, wherein the monitoring arrangement detects one or more of the following states as the fault incident:
   a short circuit of a winding of the stator coil,
   a short circuit of multiple windings of the stator coil,
   a short circuit of all windings of the stator coil,
   a single short circuit to ground of the stator coil,
   multiple short circuits to ground in the stator coil, or
   a high-resistance connection within the stator coil.

3. The transverse flux machine according to claim 1, wherein the monitoring arrangement detects heating of the stator coil by a temperature sensor to thereby detect overloads, short circuits or other faults in the stator coil.

4. The transverse flux machine according to claim 1, wherein the monitoring arrangement detects a short circuit to ground in the stator coil by a potential monitoring circuit for monitoring insulation.

5. The transverse flux machine according to claim 1, wherein the power source has two half bridges for switching electric powers.

6. The transverse flux machine according to claim 5, wherein:
   each of the two half bridges have a first and a second semiconductor switch connected in series;
   each of the first and second semiconductor switches has a control input;
   the first semiconductor switch has a first power terminal which is connected to a high voltage potential;
   the second semiconductor switch has a second power terminal that is connected to a low voltage potential; and
   a second power terminal of the first semiconductor switch is connected to a first power terminal of the second semiconductor switch, forming a terminal for the stator coil.

7. The transverse flux machine according to claim 6, wherein the monitoring arrangement triggers the power source in the event of the fault incident so that in the two half bridges either:
   the second semiconductor switch remains conducting and the first semiconductor switch remains untriggered; or
   the first semiconductor switch remains conducting and the second semiconductor switch remains untriggered.

8. The transverse flux machine according to claim 6, wherein each of the first and second semiconductor switches has a free-wheeling diode which is parallel to the first and second power terminals of the respective semiconductor switch.

9. The transverse flux machine according to claim 1, wherein the stator coil and a respective electric loading are of such dimensions that a magnetomotive force that reaches a rated magnetomotive force of the stator coil never occurs in the event of the fault incident.

10. The transverse flux machine according to claim 1, wherein the stator is a soft magnetic molded body.

11. The transverse flux machine according to claim 10, wherein the stator is made of pressed and/or sintered metal powder.

12. The transverse flux machine according to claim 1, wherein the stator coil is formed by multiple ring sections, wherein:
   several of the ring sections form a ring which is arranged essentially concentrically with a neighboring ring,
   each ring section is connected on at least one of its two ends to a ring section that is farther toward an outside or inside radially; and
   the ring sections that are entirely on the outside radially are connected at one of their two ends to a ring section that is entirely on the inside radially and the ring sections that are entirely on the inside radially are connected at one of their two ends to a ring section that is entirely on the outside radially.

13. The transverse flux machine according to claim 1, wherein the rotor is made at least partially of a soft magnetic material.

14. A turbine-type machine, in particular a gas turbine, in particular an aircraft gas turbine having a transverse flux machine according to claim 1, wherein the transverse flux machine is connected to a rotating shaft of the turbine-type machine in a rotationally fixed manner.

15. The turbine-type machine according to claim 14, wherein the transverse flux machine is a generator.

16. The turbine-type machine according to claim 14, wherein the transverse flux machine is a starter generator.

* * * * *

UNITED STATES PATENT AND TRADEMARK OFFICE
CERTIFICATE OF CORRECTION

PATENT NO. : 7,629,718 B2  Page 1 of 1
APPLICATION NO. : 11/413875
DATED : December 8, 2009
INVENTOR(S) : Gruendel et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 788 days.

Signed and Sealed this

Twenty-first Day of December, 2010

David J. Kappos
*Director of the United States Patent and Trademark Office*